(12) United States Patent
Goldenberg (10) Patent No.: US 10,533,568 B2
(45) Date of Patent: Jan. 14, 2020

(54) CENTRIFUGAL COMPRESSOR WITH SEAL BEARING

(71) Applicant: Daikin Applied Americas Inc., Minneapolis, MN (US)

(72) Inventor: Vladislav Goldenberg, Plymouth, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 130 days.

(21) Appl. No.: 15/797,280

(22) Filed: Oct. 30, 2017

(65) Prior Publication Data

US 2019/0128273 A1    May 2, 2019

(51) Int. Cl.
| | |
|---|---|
| F04D 29/16 | (2006.01) |
| F04D 29/056 | (2006.01) |
| F04D 29/063 | (2006.01) |
| F04D 29/28 | (2006.01) |
| F04D 29/08 | (2006.01) |

(Continued)

(52) U.S. Cl.
CPC ......... *F04D 29/056* (2013.01); *F04D 29/046* (2013.01); *F04D 29/0473* (2013.01); *F04D 29/063* (2013.01); *F04D 29/083* (2013.01); *F04D 29/284* (2013.01); *F01D 11/003* (2013.01); *F01D 11/02* (2013.01); *F01D 11/025* (2013.01); *F01D 15/005* (2013.01); *F04D 17/10* (2013.01); *F04D 25/06* (2013.01); *F04D 29/162* (2013.01); *F05D 2250/51* (2013.01); *F16C 33/74* (2013.01); *F16C 33/748* (2013.01); *F16J 15/44* (2013.01)

(58) Field of Classification Search
CPC .... F04D 29/162; F04D 29/167; F01D 15/005; F01D 11/003; F01D 11/02; F01D 11/025; F16J 15/44–4478; F16C 33/74; F16C 33/748

USPC .................................................. 277/409–421
See application file for complete search history.

(56) References Cited

U.S. PATENT DOCUMENTS

| | | | | |
|---|---|---|---|---|
| 1,090,073 | A * | 3/1914 | Kieser ................... | F04D 29/162 415/172.1 |
| 2,162,486 | A * | 6/1939 | Le Tourneau ........ | F04D 29/167 277/563 |

(Continued)

FOREIGN PATENT DOCUMENTS

| | | |
|---|---|---|
| DE | 10 2012 218 861 A1 | 4/2014 |
| JP | 2015-143474 A | 8/2015 |

OTHER PUBLICATIONS

International Search Report for the corresponding international application No. PCT/US2018/054324, dated Jan. 18, 2019.

*Primary Examiner* — Dwayne J White
*Assistant Examiner* — Behnoush Haghighian
(74) *Attorney, Agent, or Firm* — Global IP Counselors, LLP (57) ABSTRACT

A centrifugal compressor to be used in a chiller system includes a casing, an impeller, a motor and a diffuser. The casing has an inlet portion and an outlet portion. The impeller is attached to a shaft rotatable about a rotation axis, and has an impeller shroud which encloses the impeller. The motor rotates the shaft in order to rotate the impeller. The diffuser is disposed in the outlet portion downstream of the impeller. The centrifugal compressor further includes a seal bearing. The seal bearing is attached to the inlet portion to seal the impeller shroud, and rotatably supports the impeller and the shaft.

16 Claims, 9 Drawing Sheets

(51) Int. Cl.
   *F04D 29/046*   (2006.01)
   *F04D 29/047*   (2006.01)
   *F04D 17/10*   (2006.01)
   *F04D 25/06*   (2006.01)
   *F01D 11/00*   (2006.01)
   *F01D 11/02*   (2006.01)
   *F01D 15/00*   (2006.01)
   *F16C 33/74*   (2006.01)
   *F16J 15/44*   (2006.01)

(56) References Cited

U.S. PATENT DOCUMENTS

| | | | | |
|---|---|---|---|---|
| 5,161,943 A | * | 11/1992 | Maier | F01D 11/02 277/412 |
| 5,190,440 A | * | 3/1993 | Maier | F01D 11/02 277/412 |
| 6,039,534 A | * | 3/2000 | Stoner | F01D 17/162 415/150 |
| 6,039,535 A | * | 3/2000 | Kobayashi | F04D 29/102 415/172.1 |
| 6,129,507 A | * | 10/2000 | Ganelin | F01D 3/00 415/1 |
| 7,189,052 B2 | * | 3/2007 | Jones | F02B 33/40 415/170.1 |
| 7,775,763 B1 | * | 8/2010 | Johnson | F04D 29/167 415/111 |
| 8,074,998 B2 | * | 12/2011 | Childs | F16J 15/444 277/414 |
| 9,790,953 B2 | * | 10/2017 | Kleynhans | F04D 29/284 |
| 9,903,477 B2 | * | 2/2018 | Ranz | F04D 29/057 |
| 2015/0192147 A1 | | 7/2015 | An et al. | |
| 2016/0238015 A1 | * | 8/2016 | Mei | F01D 11/04 |
| 2018/0030992 A1 | * | 2/2018 | Masutani | F04D 17/125 |
| 2019/0055962 A1 | * | 2/2019 | Nakaniwa | F04D 29/161 |

* cited by examiner

CENTRIFUGAL COMPRESSOR WITH SEAL BEARING

BACKGROUND

Field of the Invention

The present invention generally relates to a centrifugal compressor used in a chiller system. More specifically, the present invention relates to a centrifugal compressor with a seal bearing.

Background Information

A chiller system is a refrigerating machine or apparatus that removes heat from a medium. Commonly a liquid such as water is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas. The diffuser works to transform the velocity of refrigerant gas (dynamic pressure), given by the impeller, into (static) pressure. The motor rotates the impeller. The controller controls the motor, the inlet guide vane and the expansion valve. In this manner, the refrigerant is compressed in a conventional centrifugal compressor. A conventional centrifugal compressor may have one or two stages. A motor rotates one or more impellers via shaft. A bearing system supports the shaft of the motor. The impeller of a conventional centrifugal compressor includes a closed impeller, a semi-open impeller or an open impeller. A closed impeller or a semi-open impeller has an impeller shroud which encloses the impeller.

U.S. Patent Application Publication No. 2015/0192147 has disclosed a centrifugal compressor which uses a closed impeller.

SUMMARY

In a conventional centrifugal compressor which uses a closed impeller, bearings and a seal for the impeller shroud are necessary components. In a conventional centrifugal compressor, however, a bearing system and a seal for the impeller shroud are provided separately. It has been considered difficult to fit a bearing in the inlet portion of the compressor because the inlet portion of the compressor needs to be of a significantly large size to accommodate a bearing. In a conventional centrifugal compressor, therefore, a bearing system is provided typically only around the shaft of the motor.

Therefore, one object of the present invention is to provide a centrifugal compressor which has an integral seal bearing to provide a seal and a bearing in the compressor to improve the efficiency and the rotordynamic performance of the compressor.

Another object of the present invention is to provide a centrifugal compressor which has an integral seal bearing to provide a seal and a bearing in the compressor relatively simple with reduced costs.

One or more of the above objects can basically be attained by providing a centrifugal compressor adapted to be used in a chiller system, the centrifugal compressor including a casing having an inlet portion and an outlet portion, an impeller attached to a shaft rotatable about a shaft rotation axis, the impeller having an impeller shroud which encloses the impeller, a motor configured and arranged to rotate the shaft in order to rotate the impeller, a diffuser disposed in the outlet portion downstream of the impeller, and a seal bearing attached to the inlet portion to seal the impeller shroud, and rotatably supporting the impeller and the shaft.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
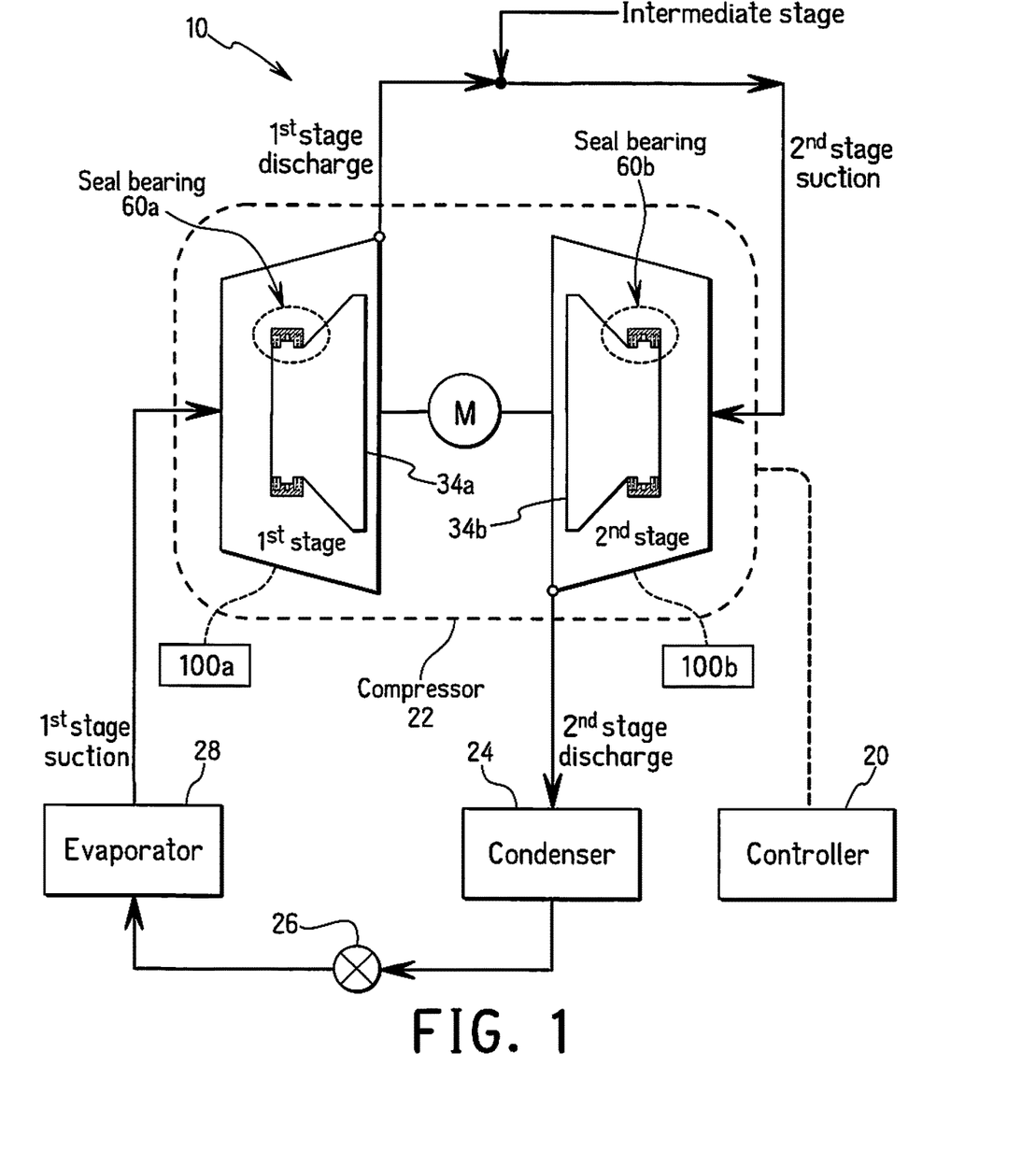
FIG. 1 is a schematic diagram illustrating a chiller system which includes a centrifugal compressor with seal bearings in accordance with an embodiment of the present invention.

Referring initially to FIG. 1, a chiller system 10, which includes a seal bearing 60 (60a, 60b), is illustrated in accordance with an embodiment of the present invention. The chiller system 10 is preferably a water chiller that utilizes cooling water and chiller water in a conventional manner. The chiller system 10 illustrated herein is a two-stage chiller system. However, it will be apparent to those skilled in the art from this disclosure that the chiller system 10 could be a single stage chiller system or a multiple stage chiller system including three or more stages.

The chiller system 10 basically includes a chiller controller 20, a compressor 22, a condenser 24, an expansion valve 26, and an evaporator 28 connected together in series to form a loop refrigeration cycle. In addition, various sensors (not shown) are disposed throughout the circuit of the chiller system 10. The chiller system 10 is conventional except that the chiller system has the seal bearing 60 (60a, 60b) in accordance with the present invention.

Figure 2:
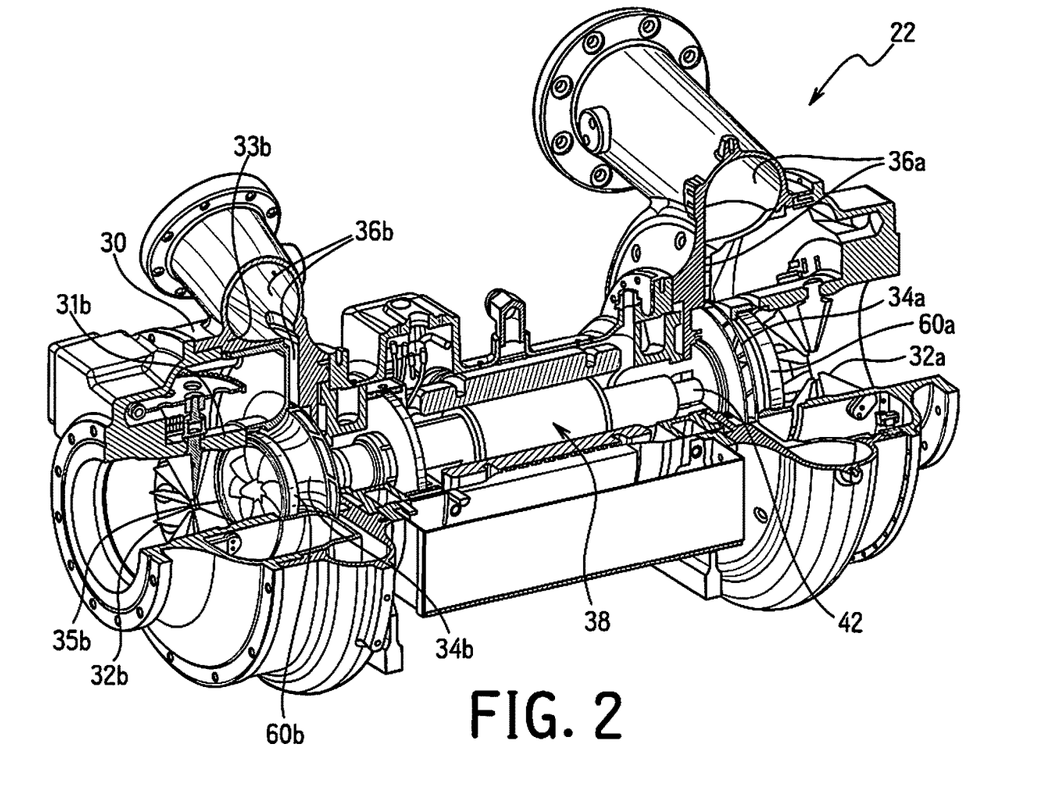
FIG. 2 is a perspective view of the centrifugal compressor of the chiller system illustrated in FIG. 1, with portions broken away and shown in cross-section for the purpose of illustration.
Figure 3:
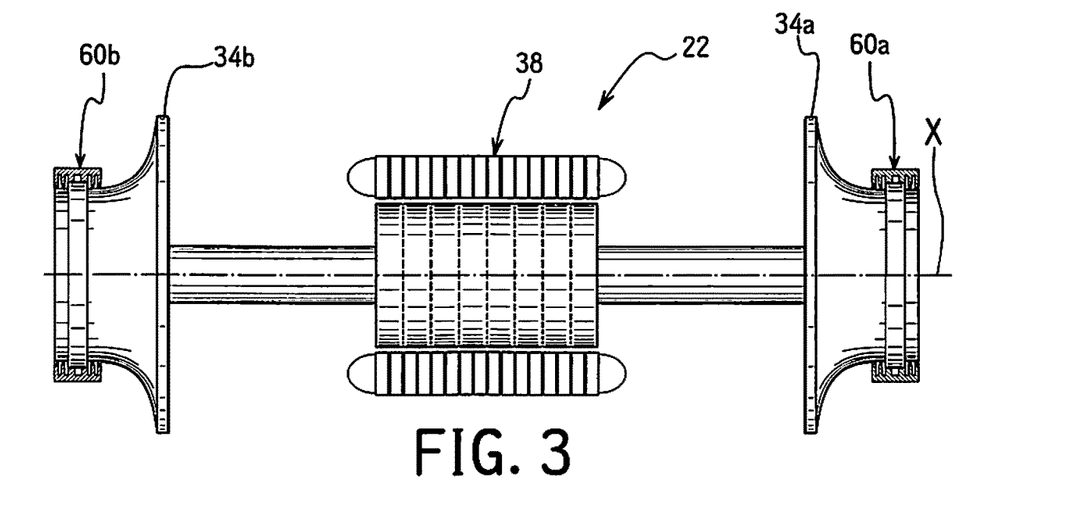
FIG. 3 is a schematic longitudinal side view of the impellers and motor of the centrifugal compressor illustrated in FIG. 2.

Referring to FIGS. 1-3, the compressor 22 is a two-stage centrifugal compressor in the illustrated embodiment. The compressor 22 illustrated herein is a two-stage centrifugal compressor which includes two impellers. However, the compressor 22 can be a multiple stage centrifugal compressor including three or more impellers. The two-stage centrifugal compressor 22 of the illustrated embodiment includes a first stage impeller 34a and a second stage impeller 34b. The impeller 34a has an impeller shroud 35a which encloses the impeller 34a, and the impeller 34b has an impeller shroud 35b which encloses the impeller 34b. The centrifugal compressor 22 further includes a first stage inlet guide vane 32a, a first diffuser/volute 36a, a second stage inlet guide vane 32b, a second diffuser/volute 36b, and a compressor motor 38 as well as various conventional sensors (not shown). A casing 30 covers the centrifugal compressor 22. The casing 30 includes an inlet portion 31a and an outlet portion 33a for the first stage of the compressor 22. The casing 30 also includes an inlet portion 31b and an outlet portion 33b for the second stage of the compressor 22.

The chiller controller 20 receives signals from the various sensors and controls the inlet guide vanes 32a and 32b, and the compressor motor 38 in a conventional manner, as explained in more detail below. Refrigerant flows in order through the first stage inlet guide vane 32a, the first stage impeller 34a, the second stage inlet guide vane 32b, and the second stage impeller 34b. The inlet guide vanes 32a and 32b control the flow rate of refrigerant gas into the impellers 34a and 34b, respectively, in a conventional manner. The impellers 34a and 34b increase the velocity of refrigerant gas, generally without changing pressure. The motor speed determines the amount of increase of the velocity of refrigerant gas. The diffusers/volutes 36a and 36b increase the refrigerant pressure. The diffusers/volutes 36a and 36b are non-movably fixed relative to the casing 30. The compressor motor 38 rotates the impellers 34a and 34b via a shaft 42. In this manner, the refrigerant is compressed in the centrifugal compressor 22. The centrifugal compressor 22 of the illustrated embodiment includes the inlet guide vanes 32a and 32b. However, the inlet guide vanes 32a and 32b are optional, and the seal bearing 60 (60a, 60b) in accordance with the present invention can be applied to a centrifugal compressor which does not include an inlet guide vane.

In operation of the chiller system 10, the first stage impeller 34a and the second stage impeller 34b of the compressor 22 are rotated, and the refrigerant of low pressure in the chiller system 10 is sucked by the first stage impeller 34a. The flow rate of the refrigerant is adjusted by the inlet guide vane 32a. The refrigerant sucked by the first stage impeller 34a is compressed to intermediate pressure, the refrigerant pressure is increased by the first diffuser/volute 36a, and the refrigerant is then introduced to the second stage impeller 34b. The flow rate of the refrigerant is adjusted by the inlet guide vane 32b. The second stage impeller 34b compresses the refrigerant of intermediate pressure to high pressure, and the refrigerant pressure is increased by the second diffuser/volute 36b. The high pressure gas refrigerant is then discharged to the chiller system 10.

Figure 11:
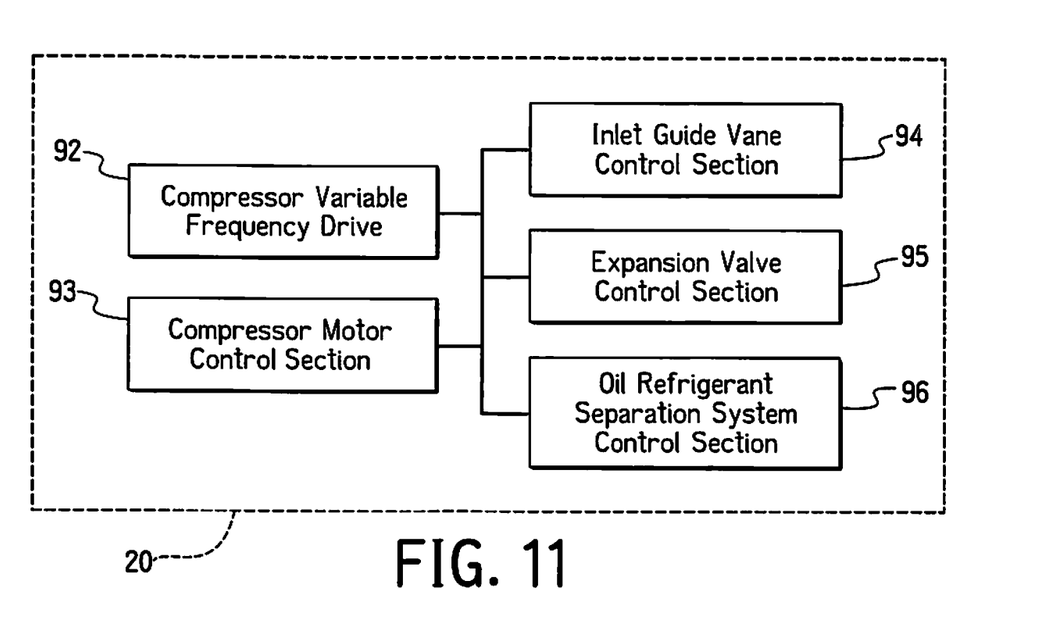
FIG. 11 is a schematic diagram of the chiller controller of the chiller system of FIG. 1.

Referring to FIGS. 1 and 11, the chiller controller 20 is an electronic controller that includes a compressor variable frequency drive 92, a compressor motor control section 93, an inlet guide vane control section 94, an expansion valve control section 95, and an oil refrigerant separation system control section 96.

In the illustrated embodiment, the control sections are sections of the chiller controller 20 programmed to execute the control of the parts described herein. The compressor variable frequency drive 92, the compressor motor control section 93, and the inlet guide vane control section 94, the expansion valve control section 95, and the oil refrigerant separation system control section 96 are coupled to each other, and form parts of a centrifugal compressor control portion that is electrically coupled to an I/O interface of the compressor 22. However, it will be apparent to those skilled in the art from this disclosure that the precise number, location and/or structure of the control sections, portions and/or chiller controller 20 can be changed without departing from the present invention so long as the one or more controllers are programmed to execute control of the parts of the chiller system 10 as explained herein.

The chiller controller 20 is conventional, and thus, includes at least one microprocessor or CPU, an Input/output (I/O) interface, Random Access Memory (RAM), Read Only Memory (ROM), a storage device (either temporary or permanent) forming a computer readable medium programmed to execute one or more control programs to control the chiller system 10. The chiller controller 20 may optionally include an input interface such as a keypad to receive inputs from a user and a display device used to display various parameters to a user. The parts and programming are conventional, and thus, will not be discussed in detail herein, except as needed to understand the embodiment(s).

As mentioned above, the chiller system 10 has the seal bearing 60 (60*a*, 60*b*) in accordance with the present invention. In the illustrated embodiment, the compressor 22 is a two-stage centrifugal compressor. A first stage seal bearing 60*a* and a second stage seal bearing 60*b* are provided in the first stage and the second stage of the compressor 22, respectively, as shown in FIG. 1. It will be apparent to those skilled in the art from this disclosure that the structures of the first stage seal bearing 60*a* and the second stage seal bearing 60*b* are identical, except that they are mirror images of each other. Therefore, the first stage seal bearing 60*a* and the second stage seal bearing 60*b* are collectively referred to as the seal bearing 60 hereinafter.

In the same manner, the elements of the first stage and the second stage of the compressor 22 are collectively referred to hereinafter without being distinguished. For example, the inlet portion 31*a* of the casing 30 for the first stage and the inlet portion 31*b* of the casing 30 for the second stage are collectively referred to as the inlet portion 31 of the casing 30. The first stage inlet guide vane 32*a* and the second stage inlet guide vane 32*a* are collectively referred to as the inlet guide vane 32. The first stage impeller 34*a* and the second stage impeller 34*b* are collectively referred to as the impeller 34.

Referring to FIGS. 4-7, the detailed structure of the seal bearing 60 in accordance with the present invention will be explained. The seal bearing 60 is attached to the inlet portion 31 to seal the impeller shroud 35 of the impeller 34, and rotatably supports the impeller 34 and the shaft 42, as explained in more detail below. The impeller shroud 35 is typically made of steel or aluminum. The seal bearing 60 can be made of/lined with steel. However, it will be apparent to those skilled in the art from this disclosure that another material can be used without departing from the present invention. As best shown in FIGS. 6A and 6B, a closed impeller is used as the impeller 34 of the compressor 22 in the illustrated embodiment. However, the present invention is not limited to the type of the impeller 34. The seal bearing 60 in accordance with the present invention can also be applied to another type of impeller so long as it has a shroud. The seal bearing 60 may be a radial bearing or a thrust bearing As best shown in FIG. 8, the seal bearing 60 includes an oil supply groove 62, an upstream oil return groove 64, a downstream oil return groove 66, an upstream separation groove 68, and a downstream separation groove 70 in the illustrated embodiment. The oil supply groove 62 is provided between an upstream center projection 63 and a downstream center projection 65 of the seal bearing 60. The upstream separation groove 68 is provided between an upstream end projection 67 and an upstream intermediate projection 69 of the seal bearing 60. The upstream oil return groove 64 is provided between the upstream center projection 63 and the upstream intermediate projection 69 of the seal bearing 60. The downstream separation groove 70 is provided between a downstream intermediate projection 71 and a downstream end projection 73 of the seal bearing 60. The downstream oil return groove 66 is provided between the downstream center projection 65 and the downstream intermediate projection 71 of the seal bearing 60. The oil supply groove 62, the upstream oil return groove 64, the downstream oil return groove 66, the upstream separation groove 68, and the downstream separation groove 70 are formed on a shroud facing surface 61 of the seal bearing 60 which faces the impeller shroud 35.

Figures 7, 8:
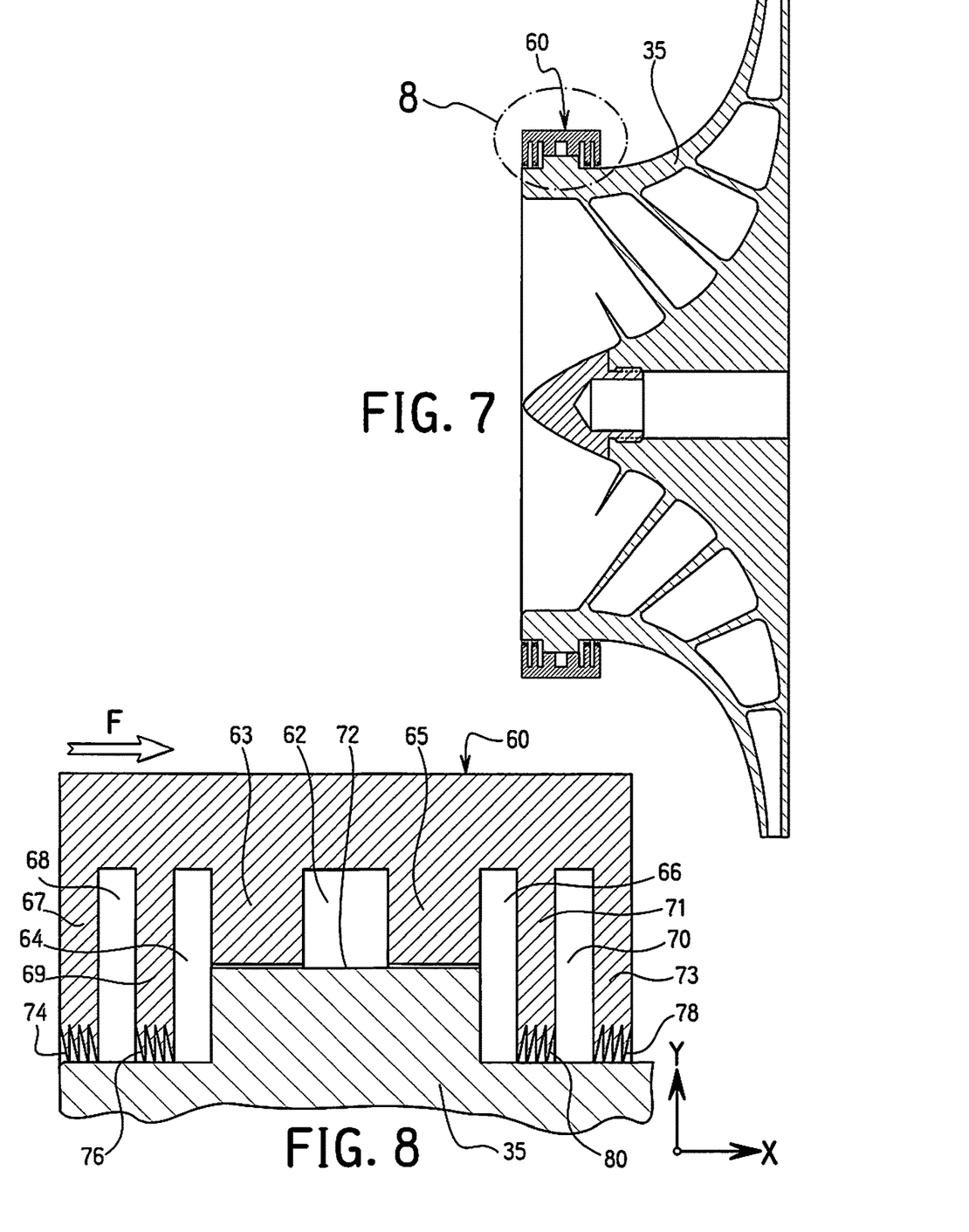
FIG. 7 is a simplified cross-sectional view of the seal bearing and the impeller shroud of the impeller illustrated in FIGS. 2-4, 6A and 6B, as taken along section line 7-7 in FIG. 6A.
FIG. 8 is an enlarged schematic cross-sectional view of the seal bearing and the impeller shroud of the impeller inside circle 8 in FIG. 7.

In the illustrated embodiment, the width of the oil supply groove 62 along an axial direction parallel to the rotational axis X is larger than the widths of the upstream oil return groove 64, the downstream oil return groove 66, the upstream separation groove 68, and the downstream separation groove 70. However, it will be apparent to those skilled in the art from this disclosure that the width of the oil supply groove 62 may be substantially the same as the widths of the upstream oil return groove 64, the downstream oil return groove 66, the upstream separation groove 68, and the downstream separation groove 70 without departing from the scope of the present invention.

Figure 4:
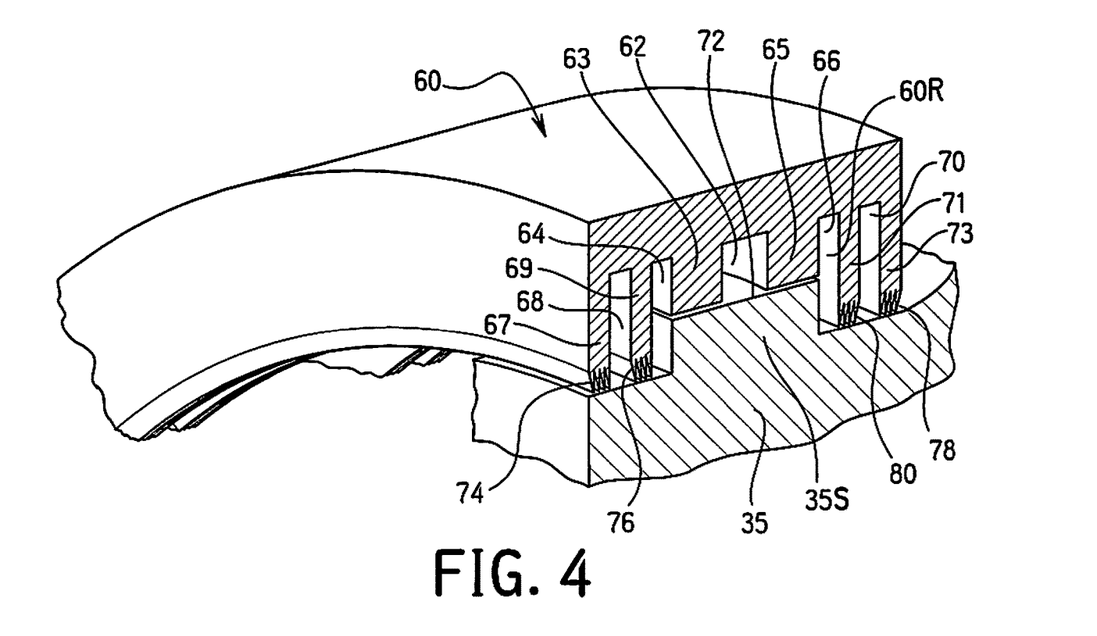
FIG. 4 is an enlarged perspective view of the seal bearing mounted on an impeller shroud of the impeller illustrated in FIG. 2, with portions broken away and shown in cross-section for the purpose of illustration.
Figure 5:
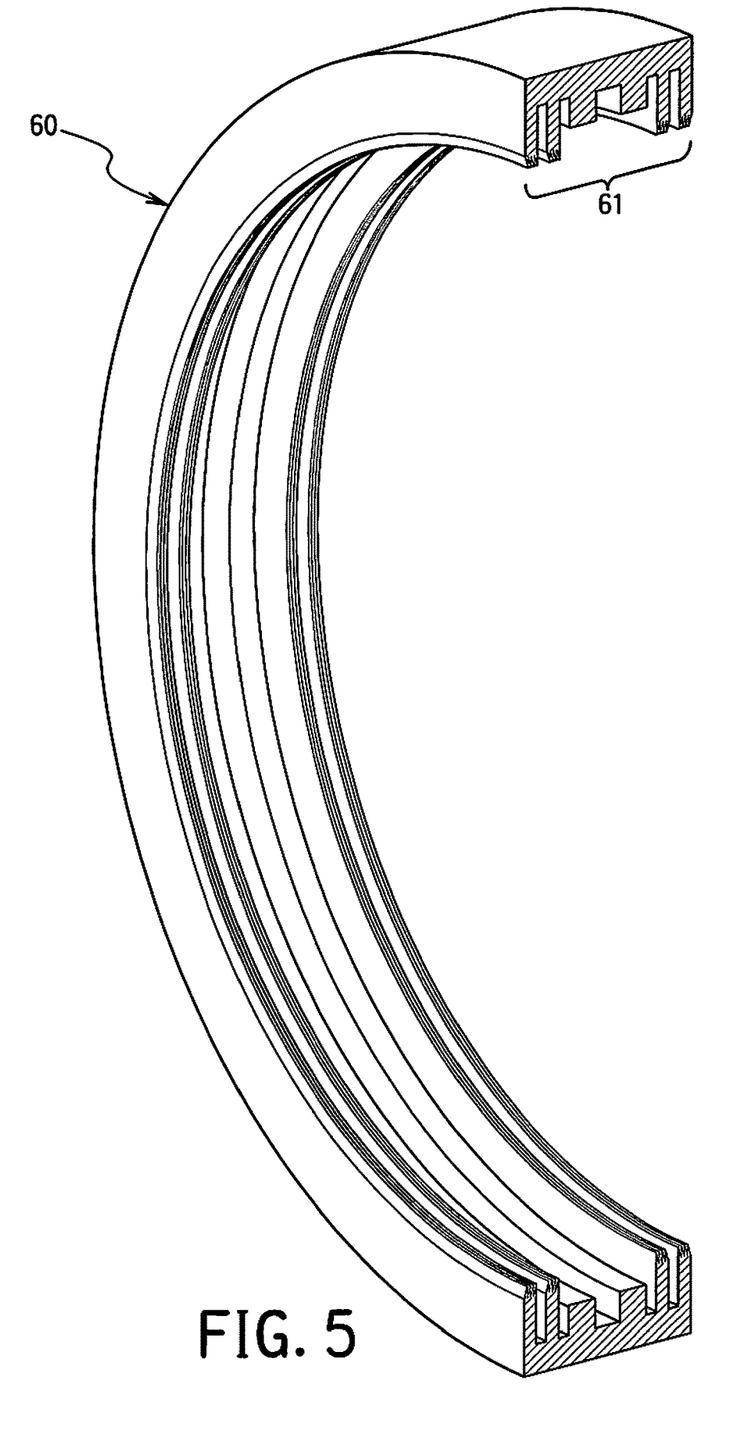
FIG. 5 is a perspective view of part of the seal bearing.
Figure 6A:
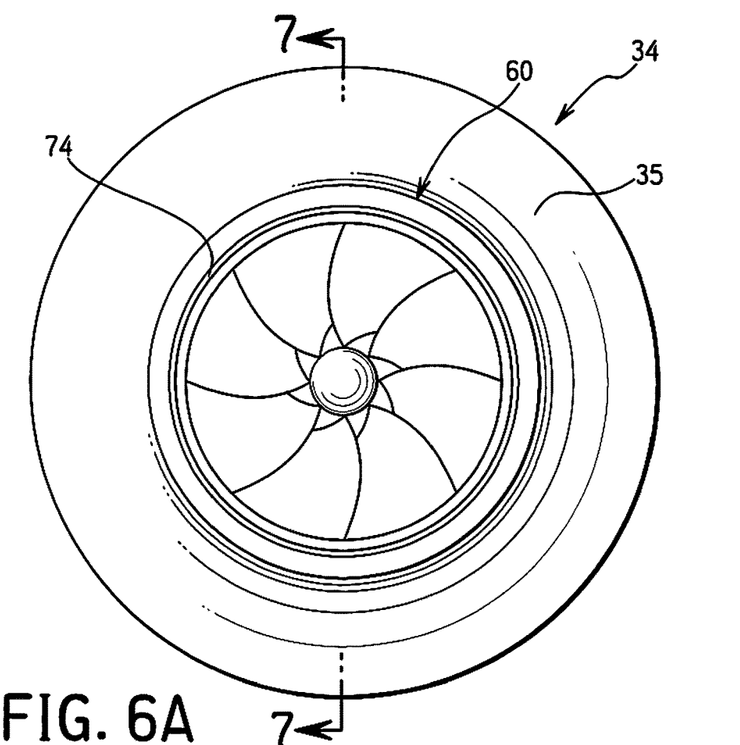
FIG. 6A is a front view of one of the impellers illustrated in FIG. 2, as seen from the inlet side of the centrifugal compressor
Figure 6B:
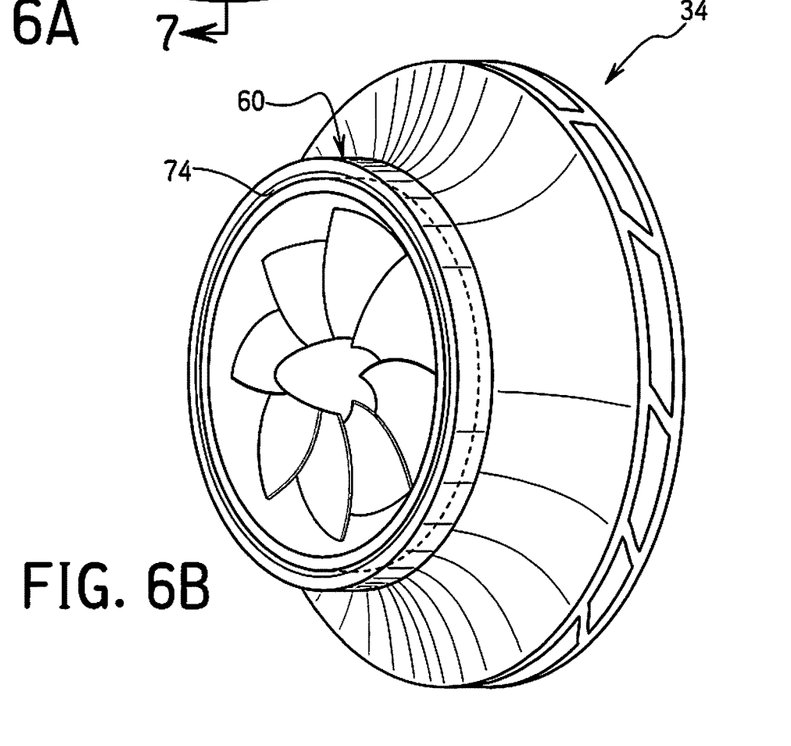
FIG. 6B is a perspective view thereof.

As shown in FIGS. 4 and 8, the impeller shroud 35 has a stepped part 35S. The stepped part 35S outwardly projects in a direction Y perpendicular to the rotational axis X. The seal bearing 60 has a recessed part 60R. The recessed part 60R receives the stepped part 35S. A gap 72 exists between the stepped part 35S of the impeller shroud 35 and the recessed part 60R of the seal bearing 60. The oil supply groove 62 is provided in the recessed part 60R. Thus, the height of the oil supply groove 62 along a direction Y perpendicular to the axial direction is smaller than the heights of the upstream oil return groove 64, the downstream oil return groove 66, the upstream separation groove 68, and the downstream separation groove 70. The recess/step combination is used to minimize leakage of oil from the return groove to the separation groove through centrifugal action. However, the recess/step combination is optional. It will be apparent to those skilled in the art from this disclosure that the recess/step combination can be omitted without departing from the present invention.

The upstream oil return groove 64 is disposed upstream of a refrigerant flow F relative to the oil supply groove 62. The downstream oil return groove 66 is disposed downstream of the refrigerant flow F relative to the oil supply groove 62. The refrigerant flow F is shown by arrow F in FIG. 8, which flows from the suction side of the compressor 22 to the discharge side of the compressor 22. With this arrangement, the oil supply groove 62 is interposed between the upstream oil return groove 64 and the downstream oil return groove 66. Oil supplied to the oil supply groove 62 flows to the upstream oil return groove 64 and the downstream oil return groove 66 through the gap 72, as explained in more detail below.

The upstream separation groove 68 is disposed upstream of the refrigerant flow F relative to the upstream oil return groove 64 and the oil supply groove 62 such that the upstream oil return groove 64 is interposed between the oil supply groove 62 and the upstream separation groove 68. The downstream separation groove 70 is disposed downstream of the refrigerant flow F relative to the downstream oil return groove 66 and the oil supply groove 62 such that the downstream oil return groove 66 is interposed between the oil supply groove 62 and the downstream separation groove 70. Oil leaking from the upstream oil return groove 64 and the downstream oil return groove 66 flows into the upstream separation groove 68 and the downstream separation groove 70, respectively. A small amount of refrigerant also flows into the upstream separation groove 68 and the downstream separation groove 70, as explained in more detail below.

In the illustrated embodiment, the upstream oil return groove 64, the downstream oil return groove 66, the upstream separation groove 68, and the downstream separation groove 70 have substantially the same width. However, it will be apparent to those skilled in the art from this disclosure that different widths may be used for the upstream oil return groove 64, the downstream oil return groove 66, the upstream separation groove 68, and the downstream separation groove 70 without departing from the scope of the present invention.

Also, in the illustrated embodiment, the seal bearing 60 includes the oil supply groove 62, the upstream oil return groove 64, the downstream oil return groove 66, the upstream separation groove 68, and the downstream separation groove 70. However, the seal bearing 60 may have only the oil supply groove 62, the upstream oil return groove 64, and the upstream separation groove 68. Similarly, the seal bearing 60 may have only the oil supply groove 62, the downstream oil return groove 66, and the downstream separation groove 70.

As best shown in FIG. 8, teeth 74-80 are formed on the shroud facing surface 61 of the seal bearing 60. More specifically, the teeth 74 is formed on the shroud facing surface 61 of the upstream end projection 67, the teeth 76 is formed on the shroud facing surface 61 of the upstream intermediate projection 69, the teeth 78 is formed on the shroud facing surface 61 of the downstream end projection 73, and the teeth 80 is formed on the shroud facing surface 61 of the downstream intermediate projection 71.

The teeth 74 are located between an end of the seal bearing 60 on the suction side of the compressor 22 with the upstream separation groove 68. The teeth 76 are located between the upstream separation groove 68 with the upstream oil return groove 64. The teeth 78 are located between an end of the seal bearing 60 on the discharge side of the compressor 22 with the downstream separation groove 70. The teeth 80 are located between the downstream separation groove 70 with the downstream oil return groove 66. The upstream separation groove 68 receives oil and refrigerant which pass through the teeth 74 and the teeth 76. Similarly, the downstream separation groove 70 receives oil and refrigerant which pass through the teeth 78 and the teeth 80.

Although a small clearance exists between the tips of the teeth 74-78 and the impeller shroud 35, the oil supplied to the oil supply groove 62 has to pass through a long and difficult path created by the teeth 74-78 to escape, and thus the teeth 74-78 serve to prevent the leakage of the oil to outside the seal bearing 60. Moreover, the oil flowing into the upstream separation groove 68 and the downstream separation groove 70 is sucked into an oil sump explained below. In this manner, the leakage of the oil lubricating the seal bearing 60 is reduced to substantially zero. The seal bearing 60 serves as a seal as well as a bearing.

The upstream separation groove 68 and the downstream separation groove 70 have an annular shape extending fully circumferentially around the impeller shroud 35. The upstream oil return groove 64 and the downstream oil return groove 66 preferably have an annular shape extending fully circumferentially around the impeller shroud 35 in the same manner as the upstream separation groove 68 and the downstream separation groove 70. Alternatively, the upstream oil return groove 64 and the downstream oil return groove 66 may have a shape extending partly circumferentially around the impeller shroud 35. The oil supply groove 62 have an arc shape but does not need to extend fully circumferentially around the impeller shroud 35.

Figure 9A:
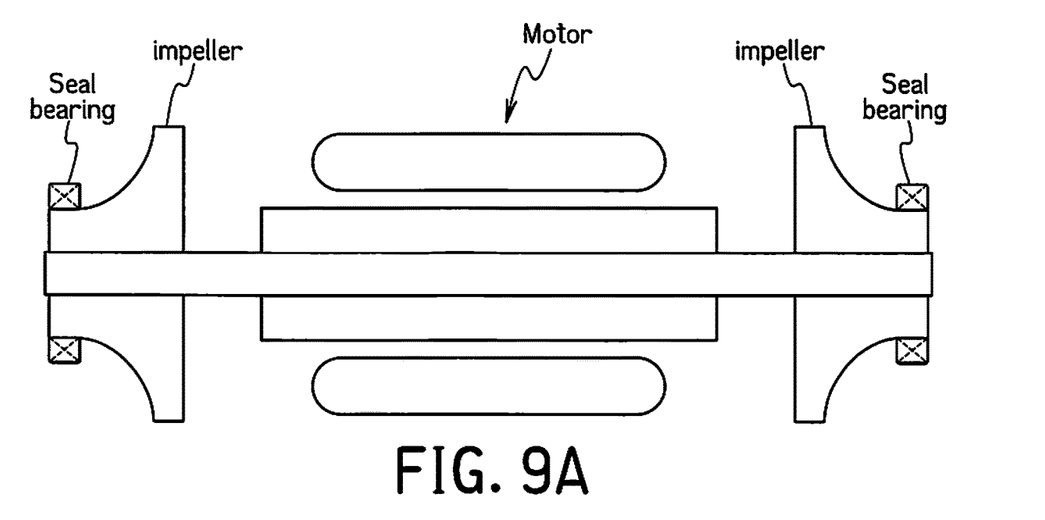
FIG. 9A is a schematic diagram illustrating a back-to-back impeller configuration and FIG. 9B is a schematic diagram illustrating an inline impeller configuration.
Figure 9B:
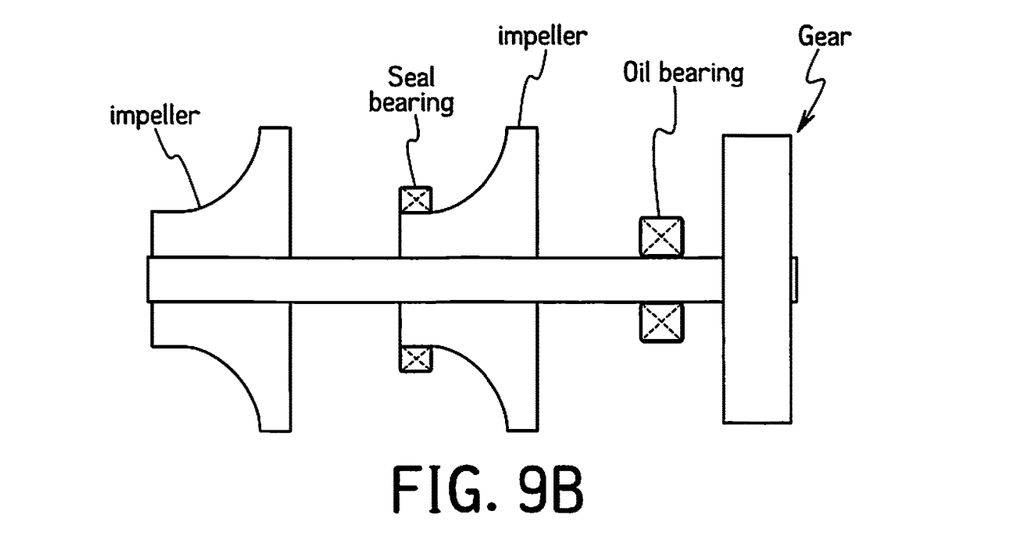

FIG. 9A is a schematic diagram illustrating a back-to-back impeller configuration and FIG. 9B is a schematic diagram illustrating an inline impeller configuration. In the back-to-back impeller configuration as shown in FIG. 9A, the seal bearings 60 are used on both impeller shrouds in a simply-supported bearing configuration. However, the present invention is not limited to the back-to-back impeller configuration. The seal bearing 60 in accordance with the present invention can also be applied to the inline impeller configuration as shown in FIG. 9B. In the inline impeller configuration as shown in FIG. 9B, a conventional bearing is used (preferably oil-lubricated) with a seal bearing 60 on one of the impellers. The oil refrigerant separation system 100 shown in FIG. 10 uses the inline impeller configuration as one example.

Referring to FIG. 1, the chiller system 10 has an oil refrigerant separation system 100a and an oil refrigerant separation system 100b. It will be apparent to those skilled in the art from this disclosure that the structures of the oil refrigerant separation system 100a and the oil refrigerant separation system 100b are identical. Therefore, the oil refrigerant separation system 100a and the oil refrigerant separation system 100b are collectively referred to as the oil refrigerant separation system 100 hereinafter. Alternatively, the chiller system 10 may have a single oil refrigerant separation system 100 used for both the seal bearing 60a and the seal bearing 60b. The single oil refrigerant separation system 100 can also be applied to the inline impeller configuration as explained in more detail below.

Figure 10:
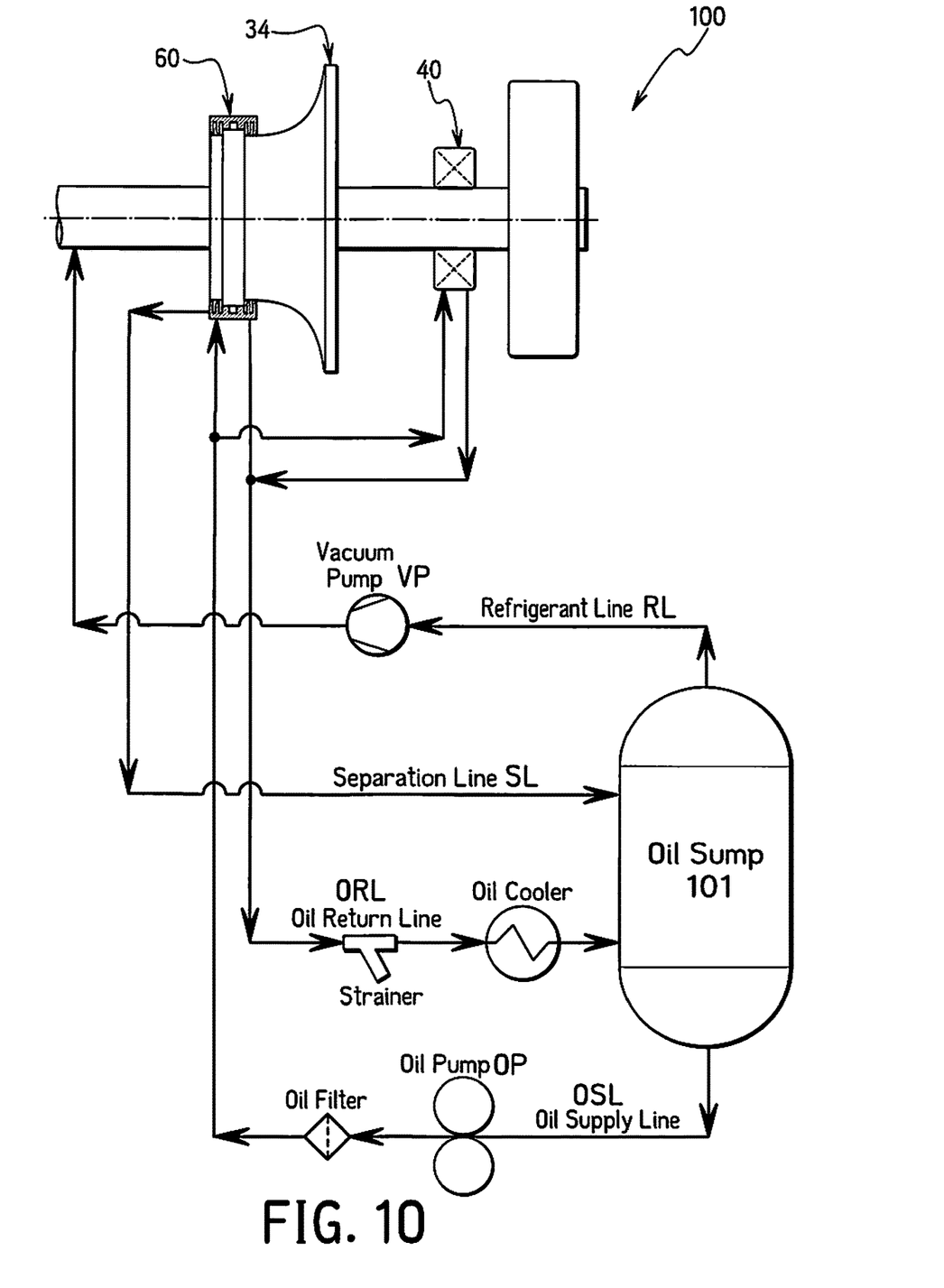
FIG. 10 illustrates an oil refrigerant separation system which includes an oil sump, an oil supply line, an oil return line, a refrigerant line, and a separation line.

Referring to FIG. 10, the oil refrigerant separation system 100 includes an oil sump 101, an oil supply line OSL, an oil return line ORL, a refrigerant line RL, and a separation line SL. The oil sump 101 is configured and arranged to receive oil and refrigerant. The oil supply line OSL extends from the oil sump 101 to the oil supply groove 62. An oil pump OP and an oil filter are disposed in the oil supply line OSL. The oil return line ORL extends from the upstream oil return groove 64 and the downstream oil return groove 66 to the oil sump 101. A strainer and an oil cooler are disposed in the oil return line ORL. The refrigerant line RL extends from the oil sump 101 to the suction side of the compressor 22. A vacuum pump VP is disposed in the refrigerant line RL. The separation line SL extends from the upstream separation groove 68 and the downstream separation groove 70 to the oil sump 101.

In the oil refrigerant separation system 100, oil lubricating the seal bearing 60 is supplied to the oil supply groove 62 from the oil sump 101 via the oil supply line OSL. The oil supplied to the oil supply groove 62 passes through the gap 72 and then flows to the upstream oil return groove 64 and the downstream oil return groove 66. The oil flowing to the upstream oil return groove 64 and the downstream oil return groove 66 is returned to the oil sump 101 via the oil return line ORL. In this manner, oil supplied to the oil supply groove 62 from the oil sump 101 is mainly returned to the oil sump 101 via the upstream oil return groove 64 and the downstream oil return groove 66.

However, some of the oil leaks from the upstream oil return groove 64 and the downstream oil return groove 66 through the teeth 76 and teeth 80, respectively, and flows into the upstream separation groove 68 and the downstream separation groove 70, respectively. A small amount of refrigerant also flows into the upstream separation groove 68 and the downstream separation groove 70 from the suction side of the compressor 22 and the discharge side of the compressor 22, respectively. The oil containing the refrigerant in the upstream separation groove 68 and the downstream separation groove 70 is sucked via vacuum created by the vacuum pump VP and introduced into the oil sump 101 via the separation line SL. In the oil sump 101, the oil containing the refrigerant is separated into an oil portion and a refrigerant portion. The refrigerant portion is returned to the suction side of the compressor 22 by using the vacuum pump VP in the refrigerant line RL. The oil portion is supplied to the oil supply groove 62 by using the oil pump OP in the oil supply line OSL. The inline impeller configuration shown in FIG. 10 includes an oil bearing 40. Some of the oil in the oil sump 101 is supplied to the oil bearing 40 via the oil supply line OSL and returned to the oil sump 101 via the oil return line ORL.

In order to achieve the above-described separation/circulation of oil and refrigerant, control is performed to satisfy the following conditions. The control may be active control by the oil refrigerant separation system control section 96. Alternatively, the control may be passive control.

1. The pressure in the upstream separation groove 68 and the downstream separation groove 70 ($P_5$) must be less than the compressor suction pressure ($P_7$).
2. The pressure in the upstream oil return groove 64 and the downstream oil return groove 66 ($P_4$) must be greater than the pressure in the upstream separation groove 68 and the downstream separation groove 70 ($P_5$).
3. The pressure in the oil supply groove 62 ($P_3$) must be greater than the pressure in the upstream oil return groove 64 and the downstream oil return groove 66 ($P_4$).

$$P_5 < P_7 \qquad \text{Condition 1:}$$

$$P_5 < P_4 < P_3 \qquad \text{Conditions 2 and 3:}$$

Condition 1 is achieved by the vacuum pump VP that generates a lower pressure in the oil sump 101 than the suction side of the compressor 22 by creating a flow of refrigerant from the oil sump 101 to the suction side of the compressor 22. Condition 2 is achieved by increasing a pressure drop in the oil return line ORL compared to the separation line SL. The increased pressure drop is caused by the components in the oil return line ORL including the strainer, the oil cooler, an optional filter (not shown) and an optional valve (not shown). Condition 3 is achieved by the oil pump OP. It will be apparent to those skilled in the art from this disclosure that the detailed sizing of the flow generating components and piping can be determined based on standard engineering practice.

An example of the system startup/shutdown procedure is shown in the following table 1:

TABLE 1

| Startup | Shutdown |
| --- | --- |
| 1. Start vacuum pump VP | 1. Verify compressor in off state |
| 2. Start oil pump OP | 2. Set compressor start to disable state |
| 3. Compressor start enable | 3. Shut down oil pump OP |
|  | 4. Shut down vacuum pump VP |

In terms of global environment protection, use of new low GWP (Global Warming Potential) refrigerants such like R1233zd, R1234ze are considered for chiller systems. One example of the low global warming potential refrigerant is low pressure refrigerant in which the evaporation pressure is equal to or less than the atmospheric pressure. For example, low pressure refrigerant R1233zd is a candidate for centrifugal chiller applications because it is non-flammable, non-toxic, low cost, and has a high COP compared to other candidates such like R1234ze, which are current major refrigerant R134a alternatives. The compressor 22 having the seal bearing 60 in accordance with the present invention is useful with any type of refrigerant including low pressure refrigerant such as R1233zd.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A centrifugal compressor adapted to be used in a chiller system, the centrifugal compressor comprising:
    a casing having an inlet portion and an outlet portion;
    an impeller attached to a shaft rotatable about a shaft rotation axis, the impeller having an impeller shroud which encloses the impeller;
    a motor configured and arranged to rotate the shaft in order to rotate the impeller;
    a diffuser disposed in the outlet portion downstream of the impeller;

a seal bearing attached to the inlet portion to seal the impeller shroud, and rotatably supporting the impeller and the shaft; and an oil sump configured and arranged to receive oil, the seal bearing including an oil supply groove formed on a shroud facing surface of the seal bearing which faces the impeller shroud, at least one oil return groove formed on the shroud facing surface of the seal bearing, and at least one separation groove formed on the shroud facing surface of the seal bearing, oil being supplied to the oil supply groove from the oil sump, and the oil being returned to the oil sump via the oil return groove.

2. The centrifugal compressor according to claim 1, wherein oil containing refrigerant in the separation groove is introduced into the oil sump in which oil containing refrigerant is separated into an oil portion and a refrigerant portion, and the refrigerant portion is returned to a suction side of the centrifugal compressor.

3. The centrifugal compressor according to claim 1, wherein the seal bearing is a radial bearing.

4. A centrifugal compressor adapted to be used in a chiller system, the centrifugal compressor comprising:

a casing having an inlet portion and an outlet portion;

an impeller attached to a shaft rotatable about a shaft rotation axis, the impeller having an impeller shroud which encloses the impeller;

a motor configured and arranged to rotate the shaft in order to rotate the impeller;

a diffuser disposed in the outlet portion downstream of the impeller; and a seal bearing attached to the inlet portion to seal the impeller shroud, and rotatably supporting the impeller and the shaft, the seal bearing including an oil supply groove formed on a shroud facing surface of the seal bearing which faces the impeller shroud, at least one oil return groove formed on the shroud facing surface of the seal bearing, the at least one oil return groove including a first oil return groove and a second oil return groove, and a first separation groove and a second separation groove formed on the shroud facing surface of the seal bearing, the oil supply groove being interposed between the first oil return groove and the second oil return groove, the first oil return groove being interposed between the oil supply groove and the first separation groove, the second oil return groove being interposed between the oil supply groove and the second separation groove, the first oil return groove and the first separation groove being disposed upstream of a refrigerant flow relative to the oil supply groove, and the second oil return groove and the second separation groove being disposed downstream of the refrigerant flow relative to the oil supply groove.

5. The centrifugal compressor according to claim 4, wherein the seal bearing is a radial bearing.

6. A centrifugal compressor adapted to be used in a chiller system, the centrifugal compressor comprising:

a casing having an inlet portion and an outlet portion;

an impeller attached to a shaft rotatable about a shaft rotation axis, the impeller having an impeller shroud which encloses the impeller;

a motor configured and arranged to rotate the shaft in order to rotate the impeller;

a diffuser disposed in the outlet portion downstream of the impeller; and a seal bearing attached to the inlet portion to seal the impeller shroud, and rotatably supporting the impeller and the shaft, the seal bearing including an oil supply groove formed on a shroud facing surface of the seal bearing which faces the impeller shroud, at least one oil return groove formed on the shroud facing surface of the seal bearing, and at least one separation groove formed on the shroud facing surface of the seal bearing, a first set of teeth and a second set of teeth being formed on the shroud facing surface of the seal bearing, the first set of teeth being located between an end of the seal bearing and the separation groove, and the second set of teeth being located between the separation groove and the oil return groove, and the at least one separation groove receiving oil and refrigerant which pass through the first set of teeth and the second set of teeth, respectively.

7. The centrifugal compressor according to claim 6, wherein the seal bearing is a radial bearing.

8. A centrifugal compressor adapted to be used in a chiller system, the centrifugal compressor comprising:

a casing having an inlet portion and an outlet portion;

an impeller attached to a shaft rotatable about a shaft rotation axis, the impeller having an impeller shroud which encloses the impeller;

a motor configured and arranged to rotate the shaft in order to rotate the impeller;

a diffuser disposed in the outlet portion downstream of the impeller; and a seal bearing attached to the inlet portion to seal the impeller shroud, and rotatably supporting the impeller and the shaft, the seal bearing including an oil supply groove formed on a shroud facing surface of the seal bearing which faces the impeller shroud, the impeller shroud having a stepped part which outwardly projects in a direction perpendicular to the shaft rotation axis, the seal bearing having a recessed part which receives the stepped part, and the oil supply groove being provided in the recessed part.

9. The centrifugal compressor according to claim 8, wherein the seal bearing further includes at least one oil return groove formed on the shroud facing surface of the seal bearing.

10. The centrifugal compressor according to claim 9, wherein the at least one oil return groove includes a first oil return groove and a second oil return groove, and the oil supply groove is interposed between the first oil return groove and the second oil return groove.

11. The centrifugal compressor according to claim 10, wherein the seal bearing further includes a first separation groove and a second separation groove formed on the shroud facing surface of the seal bearing, the first oil return groove is interposed between the oil supply groove and the first separation groove, and the second oil return groove is interposed between the oil supply groove and the second separation groove.

12. The centrifugal compressor according to claim 9, wherein
the seal bearing further includes at least one separation groove formed on the shroud facing surface of the seal bearing.

13. The centrifugal compressor according to claim 12, wherein
a first set of teeth and a second set of teeth are formed on the shroud facing surface of the seal bearing, the first set of teeth being located between an end of the seal bearing and the separation groove, and the second set of teeth being located between the separation groove and the oil return groove.

14. The centrifugal compressor according to claim 12, wherein
the separation groove has an annular shape extending circumferentially around the impeller shroud.

15. The centrifugal compressor according to claim 12, further comprising
an oil sump configured and arranged to receive oil,
oil being supplied to the oil supply groove from the oil sump, and the oil being returned to the oil sump via the oil return groove.

16. The centrifugal compressor according to claim 8, wherein
the seal bearing is a radial bearing.

* * * * *